INVENTOR
EMIL KNAPP
BY Hubbell, Cohen,
Stiefel & Filler
ATTORNEYS.

United States Patent Office 3,440,601
Patented Apr. 22, 1969

3,440,601
AIRSPEED WARNING DEVICE
Emil Knapp, Floral Park, N.Y., assignor, by mesne assignments, to Lear Siegler, Inc., Santa Monica, Calif., a corporation of Delaware
Filed Jan. 27, 1966, Ser. No. 523,450
Int. Cl. G08g 5/00; G01c 21/00; G01l 7/08
U.S. Cl. 340—27
9 Claims

ABSTRACT OF THE DISCLOSURE

An airspeed warning indicator having a pair of normally closed contacts within a housing, one operable in response to airspeed, the other operable in response to altitude whereby the contacts open upon a predetermined airspeed being achieved at any particular altitude, and including means operable from outside the housing for adjusting the airspeed at which said contacts open at any given altitude. The device further includes circuit means for energizing an indicator upon said predetermined airspeed being achieved at a preselected altitude and upon a given airspeed being achieved irrespective of altitude and means for rendering inoperative the means for causing the indicator to operate at said given airspeed irrespective of altitude.

---

This invention relates to an airspeed warning device, and more specifically to an airspeed warning device for use in aircraft having maximum allowable airspeed characteristics that varies with loadings and/or flight plans of the aircraft.

In high speed subsonic and supersonic aircraft, the maximum allowable speed is dependent at times on airspeed and at other times on a Mach speed. Since the speed of sound is a variable, the Mach number for a given indicated airspeed will increase as altitude increases. Frequently, such aircraft have a maximum allowable airspeed for various levels of flight in the lower altitude ranges. In the lower altitude ranges, the maximum allowable airspeed may either vary as altitude is increased or may remain constant over an intermediate altitude range.

Also, in the lower altitude ranges the maximum allowable airspeed may vary over a range of maximum allowable airspeeds depending on the particular load and/or flight plan of the aircraft. For example, in airline operations, the maximum permissible airspeed in the lower altitude range may vary in accordance with the number of passengers carried. In freight operations, the maximum allowable airspeed may vary with the load of the freight. Also, on long distance flights, the maximum permissible airspeed may vary as the gas load lightens.

In such high speed subsonic and supersonic aircraft, it is essential for the safety of both pilot and aircraft that the safe maximum airspeed assigned to a given such aircraft not be exceeded, and that the maximum permissive speed for all such conditions be known. For this reason, it is desirable to provide some means for apprising a pilot when the maximum allowable airspeed is exceeded for a particular flight characteristic so that appropriate action may be taken to reduce the airspeed of the aircraft to a safe operating value for that particular condition.

Therefore, an object of this invention is to provide an airspeed warning device having settable means to establish a predeterminned condition which will automatically operate a signal when the aircraft exceeds the maximum permissive airspeed for a given altitude for the predetermined conditions.

Another object is to provide a novel airspeed and Mach warning indicator for use in high speed aircraft for positively apprising a pilot when the maximum safe allowable airspeed and Mach number is exceeded where each is a variable limiting parameter in accordance with predetermined conditions.

Still another object is to provide an airspeed warning device for apprising a pilot when the airspeed of an aircraft exceeds its maximum allowable airspeed by energizing either a visible and/or audible alarm.

In accordance with this invention, the airspeed indicating device comprises essentially a switch construction including a pair of movable contacts connected in a circuit to relay means which when operated from its normal to operated condition energizes an indicating alarm means, the alarm means being energized only when the speed of the aircraft exceeds a safe value. In accordance with this invention, the movable contacts are operated upon by the pitot and static pressures to which the device is subjected. The arrangemnet is such that one contact is carried by a floating lever which is fulcrumed and rendered responsive to the expansion and contraction of an altitude capsule means. The other contact is carried on a second lever in a manner which permits the contact connected thereto to follow the movement of the first mentioned contact. A spring connected to the first and second mentioned levers biases the contacts closed during such movement. The movable contacts are thus maintained closed during the permissive airspeeds of the aircraft at given altitudes.

Operatively associated with the second lever is an airspeed capsule which functions to displace the second lever and thereby open the contacts causing a relay to deactivate and energize a warning indicator when the safe airspeed is exceeded. Operatively associated with the floating lever are two or more adjustable stops which limit the motion of the second lever. The stop means are disposed on either side of the floating lever fulcrum to control the movement of the contacts for determining a change in the limiting airspeed of the aircraft, one of the stop or pivot means determining the limiting speed at the lower altitudes, and the other for determining the limiting speeds at a higher altitude.

In accordance with this invention, a means is provided for adjusting to stop determining a range of different maximum permissive airspeeds in the lower altitudes range depending on the flight conditions imposed on the aircraft. The adjusting means include a manually operatable setting means in which the pilot may preset the particular curve or maximum airspeed value for a given flight depending on the conditions thereof, and which may be readily changed to meet changing conditions.

A feature of this invention resides in the provision of an airspeed indicator which can be readily adjusted to change the maximum allowable airspeed indications in accordance to the variable flight conditions imposed on the aircraft so that for each condition the pilot is assured of the safe speeds for such conditions.

Another feature resides in the provision wherein the airspeed warning device is relatively simple in construction and positive in operation.

Other features and advantages will become more readily apparent when considered in view of the drawings in which.

Figure 4:
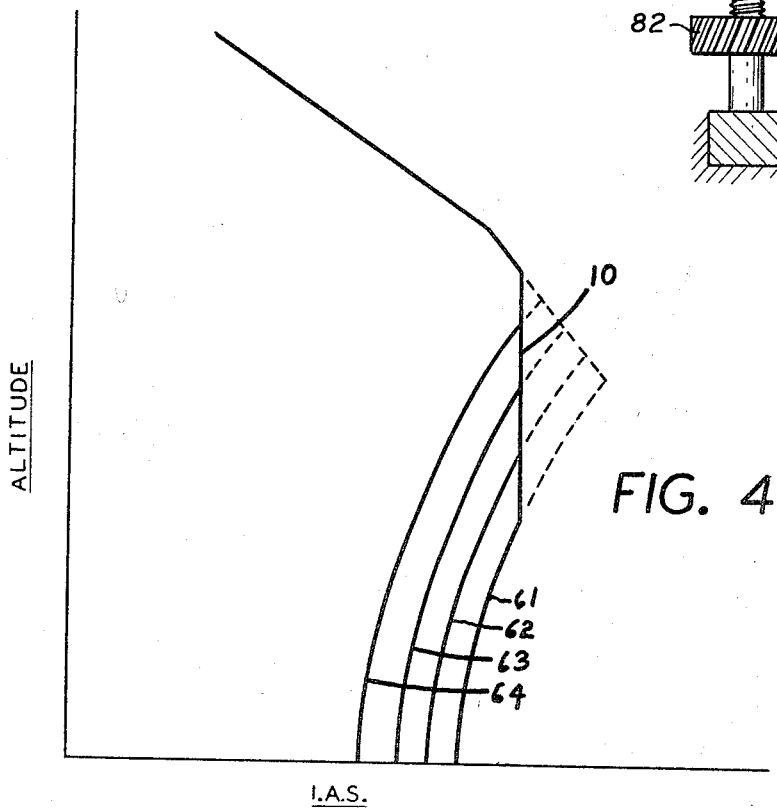
FIGURE 4 is a graphic representation illustrating a plurality of typical limiting speed curves for a given aircraft having a maximum speed characteristic that varies according to various conditions imposed thereon.

With reference to the drawings, FIG. 4 illustrates a typical speed curve for certain types of high speed aircraft having a maximum allowable speed that is at times dependent on airspeed and at other times dependent upon a Mach speed. Since the speed of sound is a variable, the Mach number for a given indicated airspeed will increase as altitude increases. Frequently such aircraft have a maximum allowable airspeed for various levels of flight in the lower altitude ranges which may vary under different conditions, e.g. load, distance of flight, etc., as indicated by the different lower portions of the speed curve, each indicating a maximum allowable speed range for a given condition. In such aircraft the maximum allowable airspeed will usually increase with altitude an indicated. In some aircraft, the maximum allowable airspeed is constant in an intermediate altitude range. This portion of the curve is indicated by line 10. Therefore, it is essential for the safety of both pilot and aircraft to provide in such aircraft, an airspeed warning device which will automatically and positively apprise a pilot when the maximum allowable airspeed in either speed range is exceeded for a given altitude.

Figure 1:
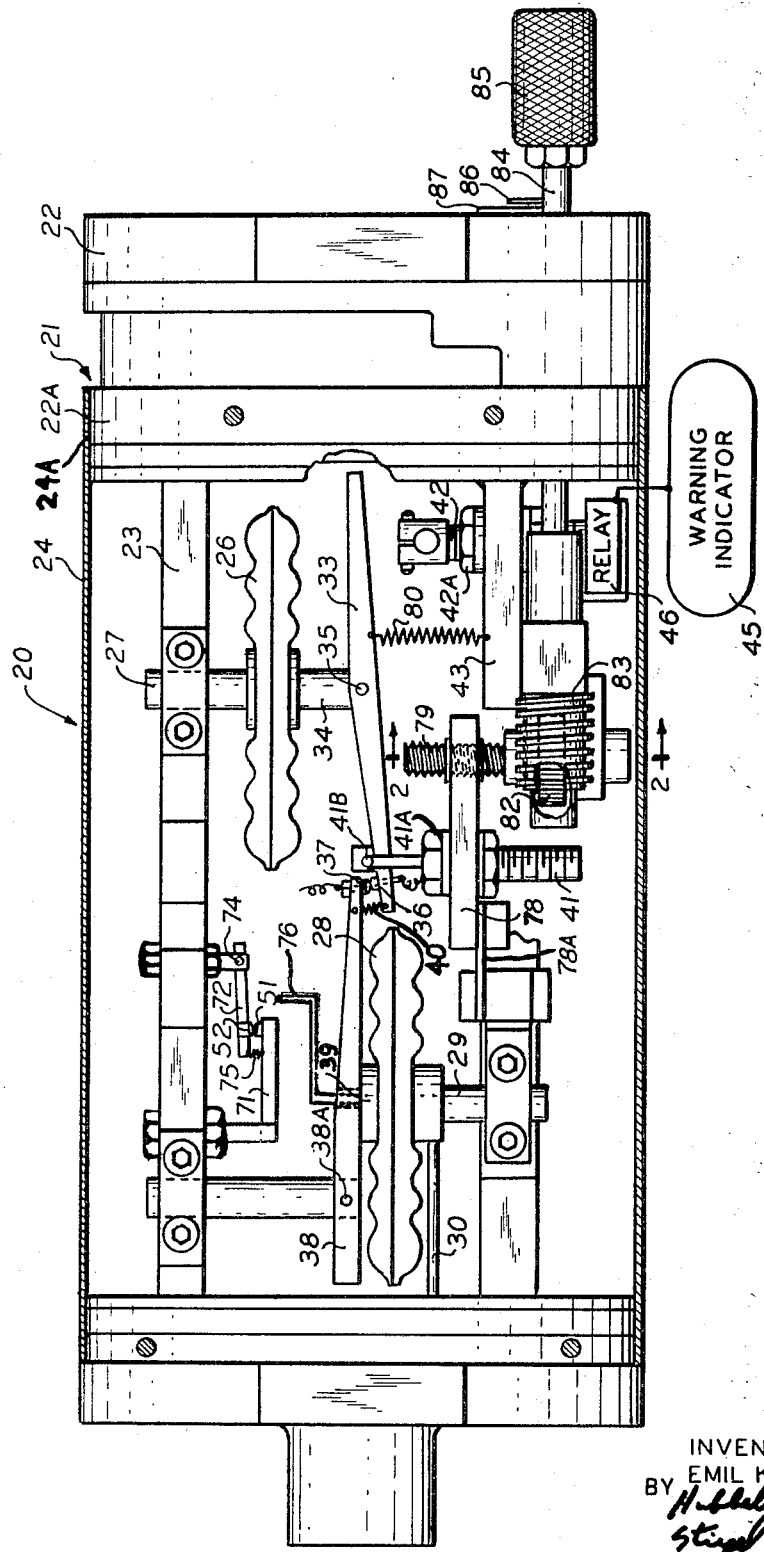
FIGURE 1 is a sectional side view of the airspeed warning device of this invention.
Figure 2:
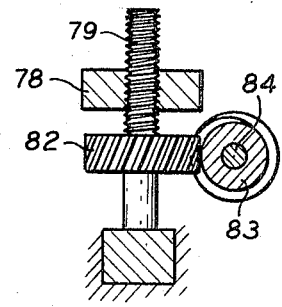
FIGURE 2 is a detail sectional side taken along line 2—2 on FIG. 1.

Referring to the drawings, FIG. 1 illustrates an airspeed warning device 20 of this invention of the type disclosed in a copending application Ser. No. 469,051 filed June 22, 1965, now Patent No. 3,302,167. It comprises a cast framework 21 having a front end 22 and a connected body portion 23. The body portion 23 of the framework 21 is enclosed in a cup shaped housing 24 which is connected at its open end 24A to a peripheral flange 22A formed integrally with the front end 22 of the cast framework 21.

Disposed on the body 23 of the framework 21 is an aneroid altitude capsule 26 which is adapted to expand and contract in response to changes in altitude. In the illustrated embodiment the altitude capsule 26 is connected to the framework body 23 by an adjustable center post 27.

To the rear of the framework 21 there is disposed an airspeed capsule 28 which is arranged to expand and contract in response to changes in airspeed. Accordingly, the airspeed capsule 28 is connected to the lower body portion 23 by an adjustable post 29. A conduit 30 connecting with the pitot coupling of the device forms the connection between airspeed capsule 28 and the pitot tube (not shown) of the aircraft, the interior of the device 20 being open to the static pressure through the static tap (not shown) which connects to the static coupling of the device.

In accordance with this invention, a floating lever 33 is connected intermediate the ends thereof to the center piece 34 of the altitude capsule 26 about a pivot 35. Connected to the inner or left end of the lever 33, as viewed in FIG. 1, is an electrical contact 36, which is one of a pair of movable contacts. The other contact 37, arranged to engage contact 36, is carried on the end of a lever 38. As shown, lever 38 is fulcrumed about pivot 38A. Lever 38 is arranged to extend over the center piece 39 of the airspeed capsule 28 whereby the latter is adapted to operate upon the lever 38 on the expansion and contraction of capsule 28. Tension spring 40 connected between levers 33 and 38 will normally urge contact 37 into engagement with contact 36. Also, the lever 38 will permit contact 37 connected thereto to follow the movement of contact 36 so long as the maximum allowable speed of the aircraft is not exceeded as will be hereinafter described. It will be observed that in the form illustrated in FIG. 1, the center piece 39 of the airspeed capsule 28 is arranged to push the lever 38 upwardly as airspeed is increased. If desired, fine calibration of the airspeed capsule expansion in the high speed ranges may be had by several adjustable calibrating screws (not shown). Such screws are useful in shaping the maximum allowable curve below a given altitude, e.g. 22,500 feet, where the equivalent airspeed relationship holds and where the tolerances are the most difficult to achieve.

In accordance with this invention, there is disposed on either side of the floating lever pivot 35 a stop or limiting pivot means. In the form of FIG. 1, two such limiting pivot means are shown. Each of the steps or pivot means comprises an adjustable screw 41 and 42; each are maintained in their respective adjusted positions by lock nuts 41A and 42A respectively. As shown, stop screw 41 has a laterally extending stop bar 41B disposed in the path of lever 33 to engage the floating lever 33 at a point intermediate pivot 35 and the left end of the lever 33. The other stop screw 42 projects upwardly from a mounting 43 connected to the bottom wall of the framework 21 in the vicinity of the right end of lever 33 as viewed in FIG. 1.

Figure 3:
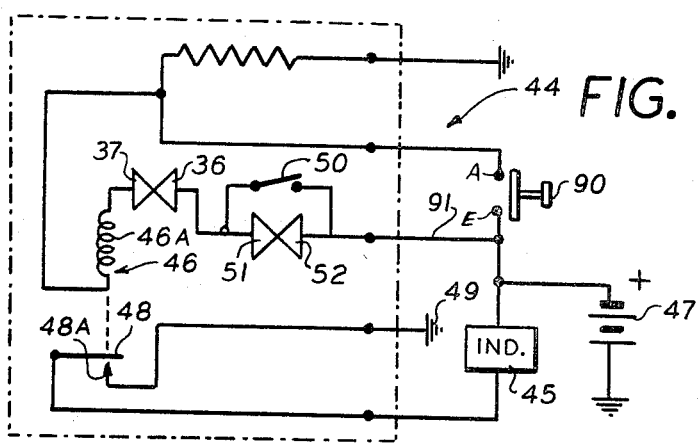
FIGURE 3 is a schematic wiring diagram of the circuit of the instant invention.

The movable contacts 36, 37 are electrically connected in a circuit 44 in FIG. 3 containing an indicating or warning means 45 which may be either an audible alarm, e.g. a bell or horn, and/or a visible alarm, e.g. a light. The warning indicator 45 is suitably located within the cockpit of the aircraft. Included in the circuit 44 is a relay 46 for energizing the alarm or indicator 45 when the movable contacts 36, 37 are opened by the center piece 39 of the airspeed capsule as the safe allowable airspeed of an aircraft for a given altitude is exceeded when a selector switch 50 is closed, as will be hereinafter described.

As best seen in FIGS. 1 and 3, there is included in the circuit 44 a second pair of contacts 51, 52 which are normally closed. The second pair of contacts 51, 52 are connected in the circuit in series with movable contacts 36, 37. The selector switch 50 is connected across contacts 51 and 52 to short out the same when the switch 50 is closed. Accordingly, contacts 51 and 52 are rendered operative when switch 50 is open and inoperative when switch 50 is closed.

Referring to FIG. 1, the second pair of contacts 51, 52 are each carried on the adjacent ends of cooperating arms 71 and 72. Arm 71 is fixed, and arm 72 is pivoted about pivot 74. A spring 75 connected between ends of arms 71 and 72 maintains contacts 51 and 52 closed.

Fixed to center piece 39 of capsule 28 is an arm 76 having its free end disposed for engagement with lever 72 when capsule 28 expands a predetermined amount equivalent to a predetermined airspeed. Upon arm 76 engaging lever 72 the lever will pivot in a clockwise direction as viewed in FIG. 1 to thereby open contacts 51, 52 to actuate the indicator 45. Accordingly, the indicator will operate whenever a predetermined airspeed is exceeded regardless of altitude. It is this provision which gives rise to the curve portion 10 in the characteristic curve of the device.

In accordance with this invention, a means is provided to adjust the initial setting of the movable contacts 36, 37 so that the maximum allowable airspeed for the different conditions may be set. Accordingly, an adjusting stop screw 41 is secured to a base 78 which is mounted for up and down movement as viewed in FIG. 1 which movement is here shown to be permitted by spring fulcrum 78A although other movable mounts could be employed. To effect adjustment of the base 78 and stop screw 41 fixed thereto, the base 78 is mounted on a screw member 79 which is rotatably journalled on a bottom portion of the frame 23. Accordingly, as the threaded member or screw 79 is rotated, the base 78 and stop screw 41 connected thereto will adjust to reposition the movable contacts 36, 37. Since spring 80 tends to bias the lever 33 in a clockwise direction about pivot 35, the inner or left end of the lever will engage stop bar 41B. Accordingly, the movable contacts 36, 37 are set in a manner so that they will follow one of the established maximum speed curves 61–64 in the lower altitude ranges up and until a Mach indication is reached.

To effect adjustment of stop 41, a worm gear 82 is connected to the threaded member 79. The worm gear 82 in turn is engaged with a worm 83 which is fixed on the end of a turn shaft 84. The end of the turn shaft extends through to the front of the indicator. A knob 85 fixed to the end of the shaft facilitates turning of the same.

To indicate the particular setting of the movable contacts 36, 37 for a particular maximum airspeed flight curve 61–64, depending on the influencing factors operating on the aircraft, a pointer 86 and cooperating index 87 is provided. As shown, the index 87 is fixed to the face of the indicator, and it may be provided with any suitable device to indicate the various desired settings for the different conditions. The cooperating pointer 86 is fixed to the turn shaft 84. Accordingly, by aligning the pointer 86 to an appropriate index setting, the maximum allowable airspeed for a given condition is established.

Referring to the circuit diagram of FIG. 3, the warning indicating means 45 is connected in series with a source of electrical energy 47, e.g. a battery, and a normally opened back contact switch 48 of a relay 46, one of the back contacts 48A being connected to ground 49. The arrangement is such that the indicator 45 is deenergized so long as back contacts 48, 48A are opened. The relay coil 46A for activating the back contacts 48, 48A is connected in circuit with the normally closed movable contacts 36, 37, the coil 46A being normally energized through conductor 91 which connects with the power supply 47 when the contacts 36, 37 are closed. As contacts 36, 37 are opened by the center piece 39 of the airspeed capsule 28, when safe airspeed is exceeded as hereinbefore described, the relay 46 becomes deenergized, thus activating the back contacts 48, 48A to closed position and thereby completing the circuit to the indicating means 45. When this occurs the indicating means become energized and the alarm is sounded that the airspeed is exceeded. The alarm remains energized until the airspeed is reduced to a safe operating value. Depending on the initial setting of the movable contacts, the maximum allowable speed will follow one of the curves 61 to 64.

If the second movable pair of contacts 51, 52 operatively connected in the circuit, by switch 50 being open, the maximum allowable airspeed will follow the straight line 10 of the curve in the intermediate altitude range when contacts 51, 52 open.

To test the operation of the warning device while the aircraft is grounded for preflight purposes, a testing circuit is included. This portion of the circuitry includes a normally open pushbutton switch 90 connected between terminals E and A to short out the relay coil 46A when the pushbutton 90 is pushed closed. Thus when the aircraft is standing on the ground, the pilot need only to close the pushbutton 90 to check out the warning device 45.

The operation of the airspeed warning device is as follows.

At low altitudes, when the altitude capsule 26 is collapsed, the floating lever 33 connected thereto will engage pivot stop 41B which has been preset by knob 85 to a desired flight plan or setting. Accordingly, lever 33 will tend to pivot about stop 41B as a center as the capsule 26 expands. As the altitude of the aircraft increases, e.g., say 1,000 to 22,500 feet, the electrical contact 36 carried by the floating lever 33 will move upwardly forcing the other contact 37 connected to lever 38 to move with it. At say, 22,500 feet, the right end of the floating lever engages stop 42, and stop 42 now acts as pivot point for the floating lever. When this occurs, the electrical contact 36 begins to move downward. Because of spring 40, the other contact 37 will follow contact 36 during normal airspeeds.

The airspeed capsule 28 is provided with a center piece 39 arranged to push level 38 upwardly as airspeed is increased. Thus, when the safe airspeed limit is exceeded, the center piece 39 pushes on lever 38 an amount sufficient to cause the movable contacts 36, 37 to open, and thereby effecting deenergization of the relay 46 which results in the actuation of the warning indicator.

The separate adjustments of the pivot stops 41, 42 and their relative position along the lever permits for accurate slope adjustments to any required speed curve for a given aircraft. These adjustments also permit for recalibration over a considerable slope range in the event that new calibration requirements should arise due to changes in the given aircraft. Accordingly, by a relatively simple setting means 78 to 85, the movable contacts may be set so that the maximum allowable airspeed may follow any of several curves depending on the conditions operating on the aircraft.

While the above description has been made in connection with an instrument in which the maximum allowable airspeed increased with altitude up to a given height, it will be understood that by shifting pivot 41B horizontally the same instrument could have a uniform maximum allowable airspeed to said given height (pivot 41B at contact 36, 37) or a maximum allowable airspeed characteristic which decreases up to said given height (pivot 41B to the left of contact 36, 37). In any of these cases the characteristic curve can still be varied by turning knob 85 to move pivot 41B up and down as previously described.

What is claimed is:

1. An airspeed warning indicator for use in an aircraft having maximum allowable airspeeds characteristic that vary in accordance with the load and/or flight plan thereof comprising:
    (a) a casing, a support within said casing, an altitude responsive means,
    (b) a cooperating airspeed responsive means,
    (c) means connected to said support and disposed within said casing and cooperatively associated with said altitude and airspeed responsive means for continuously indicating when maximum allowable airspeed is exceeded regardless of altitude for a given airspeed characteristic of said aircraft, and
    (d) means partially disposed outside of said casing and partially disposed therewithin operating on the means of paragraph (c) for adjusting the same to changes in the allowable airspeed indications in accordance with loading and/or flight plan of said aircraft.

2. An airspeed warning indicator for use in aircraft comprising a casing, a support within said casing, means mounted on said support and disposed within said casing responsive to altitude, cooperating means mounted on said support within said casing responsive to airspeed, a pair of movable contacts within said casing, means for rendering one of said contacts movable in response to contraction and expansion of said altitude means, means for rendering the other contact movable in response to the expansion and contraction of said airspeed responsive means, means for maintaining said contacts normally closed during permissive airspeeds for a given altitude, and said contact being opened by said airspeed responsive means when the safe airspeed is exceeded, an indicator connected in circuit with said pair of contacts, means disposed in said circuit for activating said indicator means when said contacts are opened, and means disposed partly without and partly within said casing for adjusting the initial setting of said contacts whereby the operation of indicator may be adjusted to a prescribed airspeed characteristic that varies in accordance with the loading or flight plan of the aircraft.

3. An airspeed warning indicator comprising:
    (a) a housing,
    (b) an aneroid capsule responsive to changes in altitude mounted within said housing,
    (c) an airspeed capsule resopnsive to changes in airspeeds disposed within said housing,
    (d) a circuit operatively associated with said capsules and including a pair of movable contacts,
    (e) means connecting one of said contacts to said aneroid capsule so as to move in response thereto, (f) means biasing the other of said contacts into closed position with said one contact,
(g) said contacts being maintained closed during permissive speeds for a given altitude,
(h) a warning indicator connected in circuit with said contacts,
(i) a relay means for energizing said indicator when said pair of contacts open as the permissive speed of the aircraft is exceeded at a given altitude,
(j) means to adjust the initial setting of said contacts so that the operation of said indicator is affected in accordance with a prescribed flight characteristic of said aircraft,
(k) said adjusting means comprising:
 (i) a rotatable shaft extending from outside said housing to within said housing,
 (ii) a worm mounted on said shaft in said housing,
 (iii) a worm gear disposed in meshing relationship with said worm,
 (iv) a screw connected to said gear to rotate therewith,
 (v) a stop connected to said screw whereby the position of said stop is varied in accordance with the turn of said screw,
 (vi) said stop operating on said pair of movable contacts to set the position thereof, and
 (vii) a knob fixed to said shaft outside said housing for rotating said shaft.

4. The invention as defined in claim 3 and including a pointer and cooperating reference points for determining the setting of said knob.

5. An airspeed warning device for use in an aircraft having a maximum allowable airspeed which varies in accordance with the loading and/or flight plan of the aircraft, said device comprising:
(a) a support, an altitude responsive means on said support,
(b) a cooperating airspeed responsive means on said support,
(c) a pair of movable contacts,
(d) an indicator connected in circuit with said contacts,
(e) means for operatively connecting one each of said movable contacts with one each of said altitude and airspeed responsive means respectively, means for maintaining said indicator deenergized during permissive airspeeds at given altitudes,
(f) a second pair of contacts being connected in circuit with said indicator,
(g) and means for operatively connecting said second pair of contacts with said airspeed means for operating said second pair of contacts in response to operation of said airspeed means only,
(h) means for bypassing said second set of contacts whereby to activate said indicator only when maximum allowable airspeed for a given altitude range is exceeded, and
(i) means for adjusting the setting of said first pair of contacts to vary the operation thereof comprising
 (i) a casing for said support, said altitude and airspeed responsive means and said first and second pairs of contacts, an adjustable stop operating on said contacts, and
 (ii) means for adjusting the position of said stop, said means including a portion disposed outside of said casing for effecting said adjustment from outside of said casing.

6. An airspeed warning device for indicating the maximum allowable airspeed of an aircraft in which the maximum allowable airspeed characteristics of an aircraft may vary over a predetermined range of characteristics depending on loading and/or flight plan thereof, said device comprising:
(a) a housing, a support within said housing,
(b) an altitude capsule responsive to changes in altitude mounted on said support in said housing,
(c) an airspeed capsule responsive to airspeed disposed on said support within said housing,
(d) a circuit operatively associated with said capsule,
(e) a pair of movable contacts connected in said circuit,
(f) a lever fulcrumed intermediate the ends thereof to said altitude capsule, one of said contacts being connected to one end of said lever so as to move in response to the movement imparted thereto by said altitude capsule,
(g) means carrying the other of said movable contacts whereby the movement of said other contact follows said one contact during permissive speeds for a given altitude,
(h) a stop means operating on said lever to set the initial position of said movable contacts,
(i) said stop means including a threaded spindle,
(j) a stop bar adjustably mounted on said lever, said stop bar being disposed on the path of movement of said lever to limit the movement thereof,
(k) and means partly disposed within said housing and partly without said housing and operable from without said housing for adjusting the position of said stop bar for controlling the movement of said contacts for determining a change in limiting airspeeds,
(l) a warning indicator connected in circuit with said contacts, and
(m) a relay connected in circuit with said contacts to energize said indicator upon the opening of said contacts, said contacts being opened by the action of said airspeed capsule when the permissive speed is exceeded.

7. The invention as defined in claim 6 wherein said adjusting means includes:
(a) a worm gear in said housing connected to said spindle to rotate therewith,
(b) a worm in said housing disposed in meshing relationship to rotate said gear accordingly, a rotatable shaft fixed to said worm for rotating the latter, said shaft disposed partly within said housing and partly without, and
(c) an operating knob connected to said shaft outside of said housing for manually rotating said shaft to effect adjustment of said stop means.

8. The invention as defined in claim 7 and including a second pair of contacts,
(a) said second pair of contacts being connected in circuit with said movable contacts, and operated upon by said airspeed capsule when a maximum allowable airspeed is exceeded.

9. The invention as defined in claim 5 wherein said stop includes:
(a) a threaded spindle rotatably mounted adjacent said movable contacts and a stop adjustably threaded on said spindle to act on said movable pair of contacts,
(b) a worm gear connected to said spindle,
(c) a worm disposed in meshing relationship with said gear whereby the rotation of said worm adjusts the position of said stop, and
(d) means connected to said worm to effect the rotation thereof to adjust the positions of said stop accordingly.

References Cited

UNITED STATES PATENTS

| | | | |
|---|---|---|---|
| 3,132,323 | 5/1964 | Hauptman | 340—27 |
| 3,271,542 | 9/1966 | Hradek | 340—27 XR |
| 3,302,167 | 1/1967 | Andresen | 73—182 XR |

ALVIN H. WARING, *Primary Examiner.*

U.S. Cl. X.R.

73—182, 407